United States Patent [19]

Funabashi

[11] Patent Number: 5,047,920
[45] Date of Patent: Sep. 10, 1991

[54] HIERARCHAL SYSTEM FOR REDUCING MEMORY ACCESS TIME TO PLURAL EQUAL SIZED MEMORIES BY SIMULTANEOUSLY ADDRESSING AND ACCESSING MEMORY

[75] Inventor: Tsuneo Funabashi, Tokyo, Japan

[73] Assignee: Hitachi, Ltd., Toyko, Japan

[21] Appl. No.: 346,242

[22] Filed: May 2, 1989

Related U.S. Application Data

[62] Division of Ser. No. 15,030, Feb. 17, 1987, abandoned.

[30] Foreign Application Priority Data

Feb. 21, 1986 [JP] Japan .................. 61-35104

[51] Int. Cl.⁵ ............................... G06F 12/08
[52] U.S. Cl. .................. 364/200; 364/238.4; 364/243; 364/243.41; 364/243.4; 364/254; 364/254.7; 364/254.3; 364/260; 364/260.2
[58] Field of Search ... 364/200 MS File, 900 MS File

[56] References Cited

U.S. PATENT DOCUMENTS

| 4,317,168 | 2/1982 | Messina et al. | 364/200 |
|---|---|---|---|
| 4,464,717 | 8/1984 | Keeley et al. | 364/200 |
| 4,493,026 | 1/1985 | Olnowich | 364/200 |
| 4,577,293 | 3/1986 | Matick et al. | 365/189 |
| 4,669,043 | 5/1987 | Kaplinsky | 364/200 |
| 4,736,293 | 4/1988 | Patrick | 364/200 |
| 4,764,861 | 8/1988 | Shibuya | 364/200 |
| 4,774,654 | 9/1988 | Pomerene et al. | 364/200 |
| 4,785,398 | 11/1988 | Joyce et al. | 364/200 |

Primary Examiner—Thomas C. Lee
Assistant Examiner—Eric Coleman
Attorney, Agent, or Firm—Antonelli, Terry, Stout & Kraus

[57] ABSTRACT

When a CPU outputs an address for read-out from a memory, access to a cache memory is immediately started by use of its address signal, and in the mean time a cache controller determines whether or not the data required by the CPU exists in the cache memory and, if so, generates a selection signal for outputting only the data read out from a desired bank of the cache memory to a data bus. Acccordingly, the time necessary for address comparison in the cache controller is not added to the access cycle time of the cache memory so that the overall access time can be shortened and the throughput of the system can be improved.

3 Claims, 4 Drawing Sheets

HIERARCHAL SYSTEM FOR REDUCING MEMORY ACCESS TIME TO PLURAL EQUAL SIZED MEMORIES BY SIMULTANEOUSLY ADDRESSING AND ACCESSING MEMORY

This application is a divisional of application Ser. No. 07/015,030, filed Feb. 17, 1987 now abandoned.

BACKGROUND OF THE INVENTION

This invention relates to a memory management technique using a hierarchal memory system and to a technique which is particularly effective when applied to buffer memory devices. For instance, the present invention relates to a technique which is effective when utilized for a cache memory structure in a data processing system employing a buffer memory system.

In conventional microcomputers employing a buffer memory system, data having a high frequency of use among the data stored in a main memory, consisting of a dynamic RAM, are kept in a cache memory and are controlled by memory management means called a "cache controller" in order to improve through-put.

In the conventional buffer memory system, however, the cache memory consists of a general-purpose static RAM and the cache controller is provided as an external circuit to the CPU (central processing unit).

Moreover, access to the cache memory is made after the cache controller determines whether or not the data required by CPU exists in the cache memory.

Therefore, access is slowed by the time required for the determination by the cache controller, in comparison with the time required when the CPU makes direct access to the cache memory. In addition, the gate delay time in the cache controller or logic circuits implemented as peripheral circuits to the cache memory is also lengthened, and the cache access cycle correspondingly longer.

SUMMARY OF THE INVENTION

It is therefore an object of the present invention to shorten the access cycle time of a cache memory in a system employing a buffer memory system and to improve the through-put of the system.

The above and other objects and novel features of the present invention will become more apparent from the following description when taken in conjunction with the accompanying drawings.

Among the inventions disclosed herein, the following illustrates a typical example.

When the CPU outputs an address for referring to a memory, access to a cache memory is started immediately by use of its address signal and in the mean time a cache controller determines whether or not the data required by the CPU exists in the cache memory. If the determination is positive, the data read out is outputted to a bus.

According to the circuit arrangement described above, the time required for comparing the addresses in the cache controller is not added to the access cycle time in the cache memory so that the access time can be shortened and the system through-put can be improved.

DESCRIPTION OF THE PREFERRED EMBODIMENTS

Figure 1:
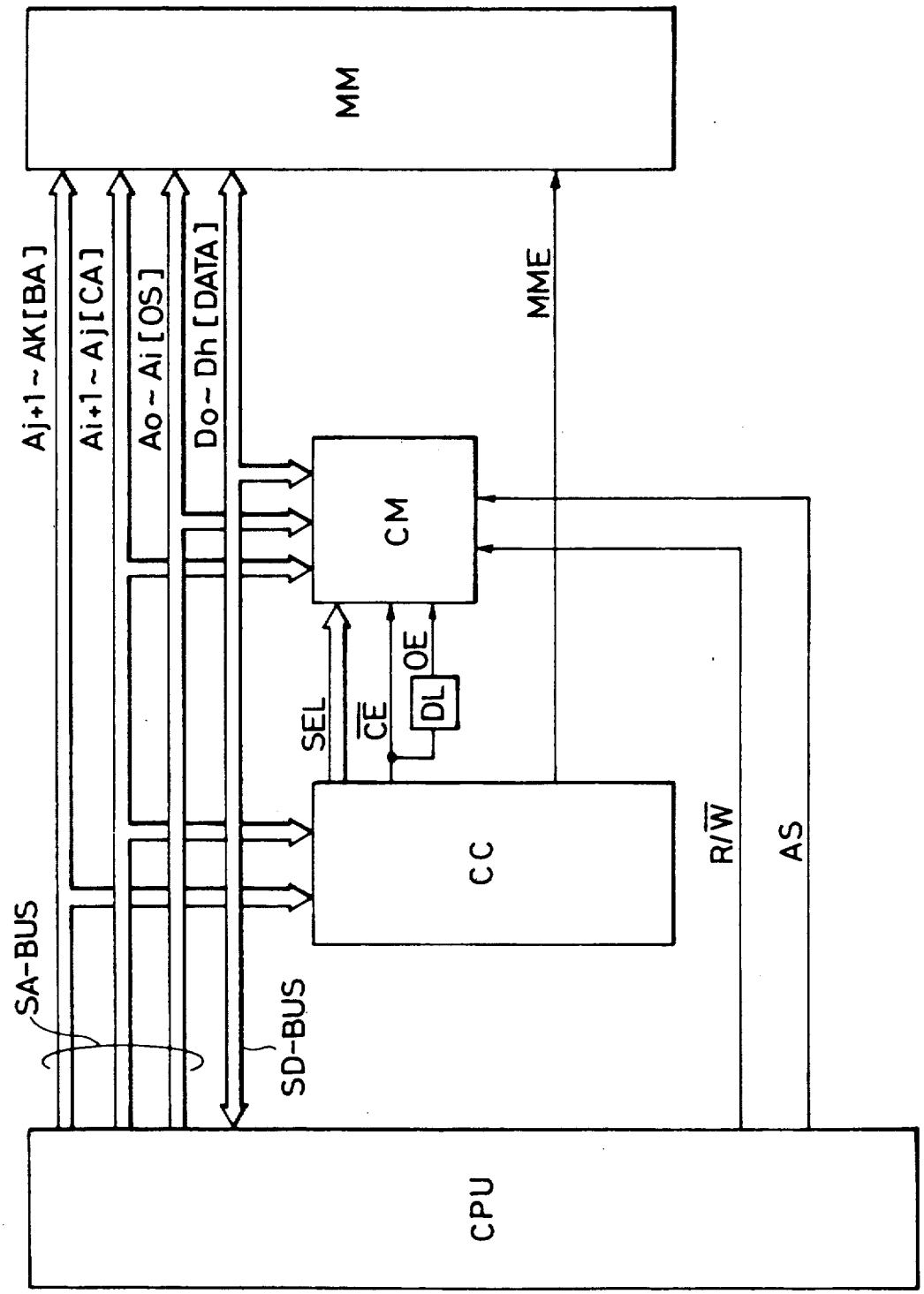
FIG. 1 is a block diagram showing an example of the construction of a hierarchal memory system to which the present invention is applied.

FIG. 1 shows an example of the construction of a microcomputer system to which the present invention is applied.

Address signals AO-AK outputted from the system CPU to a system address bus SA-BUS are selectively applied to a main memory MM, a cache controller CC and a cache memory CM. The cache controller CC refers to a table or directory stored therein and determines whether necessary data are stored in the cache memory CM or not. This determination is made on the basis of a high order address signal $(A_{j+1} \sim A_k)$ and an intermediate order address signal $(A_{i+1} \sim A_j)$ supplied to the system address bus SA-BUS. If the determination is positive, the cache controller CC forms a cache enable signal CE and supplies it to the cache memory CM. If a plurality of memory banks are provided in the cache memory CM, one or a plurality of memory bank selection signals SEL are generated and are supplied to the cache memory CM.

If the cache controller CC determines that the necessary data are not stored in the cache memory CM, on the other hand, access to the cache memory CM is terminated, and access is made instead to the main memory MM in synchronism with a main memory enable signal MME, and the data read out thereby are supplied to the CPU through the system data bus SD-BUS. When the necessary data do not exist in the cache memory CM, the memory block inclusive of the data is taken out as a whole from the main memory MM by the cache controller CC and are transferred into the cache memory CM.

Though not particularly limitative, a delay circuit DL shown as an external circuit which receives the cache enable signal $\overline{CE}$ outputted from the cache controller CC, generates an out enable signal OE, indicating the data output timing from the cache memory CM, and this signal OE is supplied to the cache memory CM. Though the delay circuit DL may be incorporated in the cache controller CC, adjustment of the delay time can be made more easily if it is an external circuit.

Figures 2, 3:
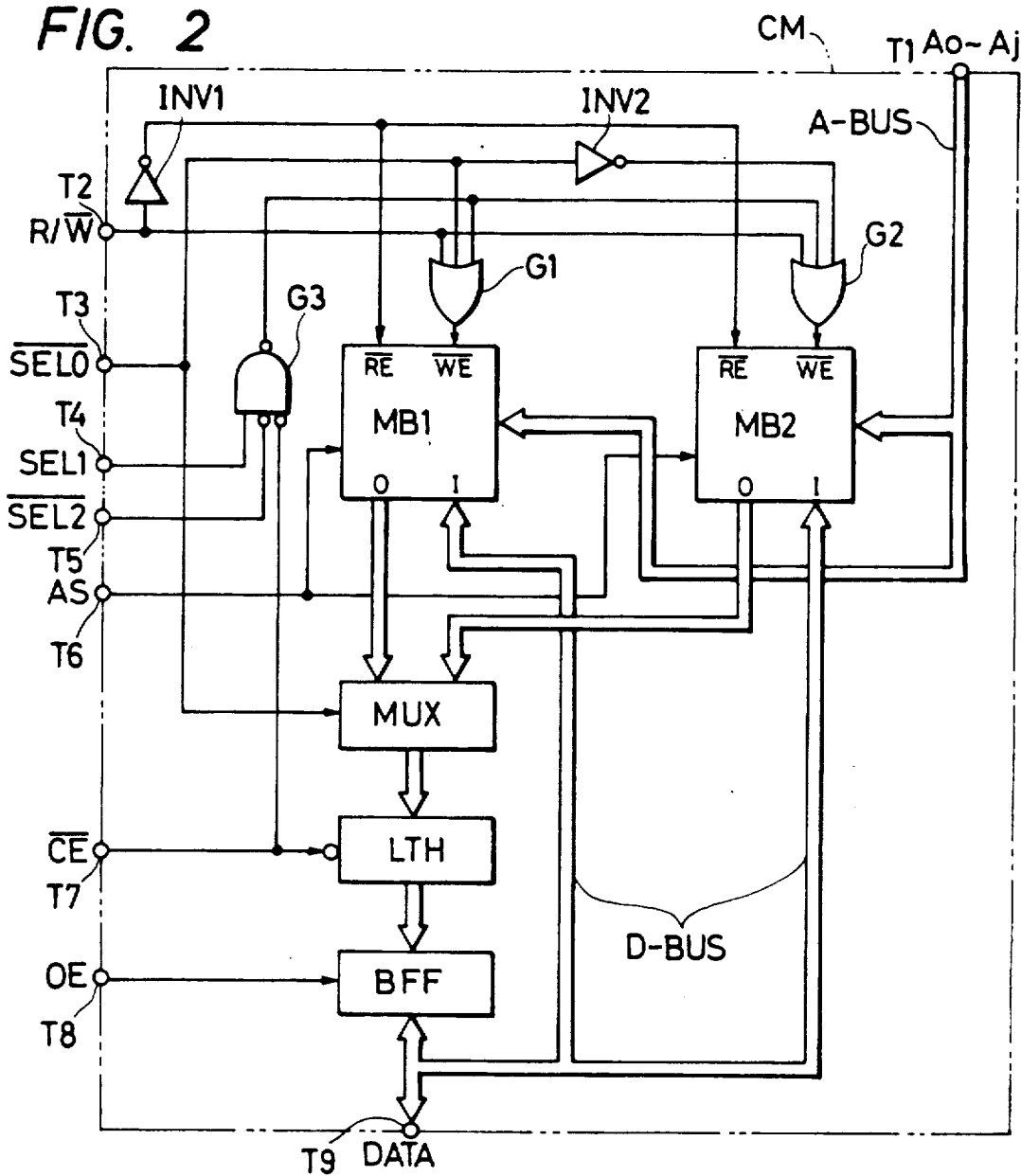
FIG. 2 is a block diagram showing an example of the construction of the cache memory CM shown in FIG. 1.
FIG. 3 is a timing chart showing the operation of the cache memory CM shown in FIG. 2.

FIG. 2 shows an embodiment of the cache memory applied to a buffer memory of a set associative system, by way of example. The term "set associative system" means a system in which a plurality of memory banks are provided in the cache memory, and this system is distinguished from a direct map system in which only one memory bank is provided.

Though not particularly limitative, each circuit block encompassed by the one-dot-chain line in the drawing is formed on one semiconductor chip such as a single crystal silicon substrate.

In this embodiment are disposed memory banks MB1 and MB2 each having a memory capacity of 32K bytes, for example. Each memory bank MB1, MB2 has substantially the same circuit construction as a heretofore known general-purpose static RAM. Address signals $A_0 \sim A_j$ are applied in common to the memory banks MB1, MB2 from an address bus A-BUS connected to an address input terminal T1 disposed on the chip. A read/write signal R/$\overline{W}$, inputted from a read control signal input terminal T2 disposed on the chip, is applied in common to the read enable terminal $\overline{RE}$ of the memory banks MB1, MB2 so that the data read-out of the data at the corresponding address is effected simultaneously by the same address signal in the word (16-bit) unit.

One-word data read out from the output terminals of the memory banks MB1, MB2 are supplied to a multiplexer MUX controlled by a select signal $\overline{SEL0}$ supplied from a terminal T3. The multiplexer MUX selects either one of the data corresponding to the select signal $\overline{SEL0}$ and supplies it to a latch circuit LTH. The latch circuit LTH latches the data supplied thereto in synchronism with the rise of a chip enable signal $\overline{CE}$ supplied from a terminal T7. The data DATA latched by the latch circuit LTH is outputted to a data input/output terminal T9 through a buffer BFF controlled by an output enable signal OE that is supplied from a terminal T8.

16-bit data that are supplied from outside through the data bus D-BUS connected to the data input/output terminal T9 can be inputted in common to the input terminals I of the memory banks MB1, MB2. OR gates $G_1$, $G_2$ generate signals to be supplied to the write enable terminal $\overline{WE}$ of each memory bank MB1, MB2, and a read/write signal R/$\overline{W}$ supplied from outside via terminal T2 is applied in common to one of the input terminals of each OR gate $G_1$, $G_2$. The select signal $\overline{SEL0}$ is applied to another input of OR gate $G_1$, and an inverted $\overline{SEL0}$ signal, from an inverter INV2, is applied to another input terminal of OR gate $G_2$. The output of NAND gate circuit $G_3$ is applied to the remaining input terminal of each OR gate $G_1$, $G_2$. At the time of data read-out or when the read/write signal R/$\overline{W}$ is at the high level, access is made simultaneously to the memory banks MB1 and MB2, but at the time of data write-in or when the read/write signal R/$\overline{W}$ is at the low level, access is made to either one of the memory banks MB1 and MB2 in accordance with the select signal $\overline{SEL0}$.

In this embodiment, further, the output of an NAND gate $G_3$, that receives as its input signals the second and third select signals SEL1, $\overline{SEL2}$ and the cache enable signal $\overline{CE}$, is applied to the input terminals of the OR gates $G_1$, $G_2$, as described above. Therefore, a buffer memory of the set associative system having four memory banks can be constituted by juxtaposing two memory chips of this embodiment.

The four memory banks in two memory chips to be connected in parallel with each other are selectively operated at the time of the write-in operation in accordance with the select signals $\overline{SEL0}$ through $\overline{SEL2}$ supplied from the external terminals T3–T5. In other words, the memory banks of which memory chips among these two memory chips are to be selected are determined by the combination of the select signals SEL1 with SEL2. Therefore, the terminal SEL1 of one memory chip and the terminal $\overline{SEL2}$ of the other memory chip are made common and the remaining terminals $\overline{SEL2}$ of the first memory chip and SEL1 of the other memory chip are made common, for example, and then the select signals outputted from the cache controller may be supplied thereto, respectively.

When the memory chip having the construction shown in FIG. 2 is used as the cache memory CM as described above, the CPU outputs the address signal to the system address bus SA-BUS in order to read out the data and brings the read/write signal R/$\overline{W}$ to the high level read level. During the period in which an address strobe signal AS, supplied thereafter from the CPU to the cache memory CM through the terminal T6, is at the high level, the address signals outputted onto the address bus are received by the memory banks MB1 and MB2 so that the data are read out from the corresponding addresses in the memory banks MB1, MB2 and are supplied to the multiplexer MUX. When the data are read out in the memory banks MB1, MB2, the cache controller CC generates the select signal $\overline{SEL0}$ and the cache enable signal $\overline{CE}$ and supplies them to the cache memory CM.

In accordance with this embodiment, therefore, the read data DATA are outputted onto the system data bus SD-BUS with hardly any delay from the change of the select signal $\overline{SEL0}$ outputted from the cache controller to the low level as shown in FIG. 3. As a result, the access cycle time of the cache memory CM can be shortened and through-put of the system can be improved.

Moreover, since the cache memory CM does not greatly depend upon the architecture of the CPU unlike the cache controller CC and a memory management unit, the memory chip of this embodiment can be used widely for CPUs having different architectures. In other words, the memory chip of the invention has extremely high versatility. Accordingly, the cost of the system can be reduced by forming the static RAM and part of its peripheral logic circuits on the same semiconductor chip, and the gate delay time in the peripheral logic circuits of the RAM can be reduced more than in a system consisting fully of external circuits. As a result, the access cycle time of the cache memory can be further reduced.

In the cache memory CM of the embodiment described above, access to the memory at the time of data write-in is made by changing the read/write signal R/$\overline{W}$ after the select signal SEL changes, the data write-in is slower than data read-out, consequently. However, since data read-out must be generally faster than data write-in in cache memories in general, there occurs no problem in particular. When the data write-in speed must be improved to the same level as that of the data read-out operation, the buffer which latches the data outputted from the CPU may be implemented inside the memory chip of this embodiment.

Figure 4:
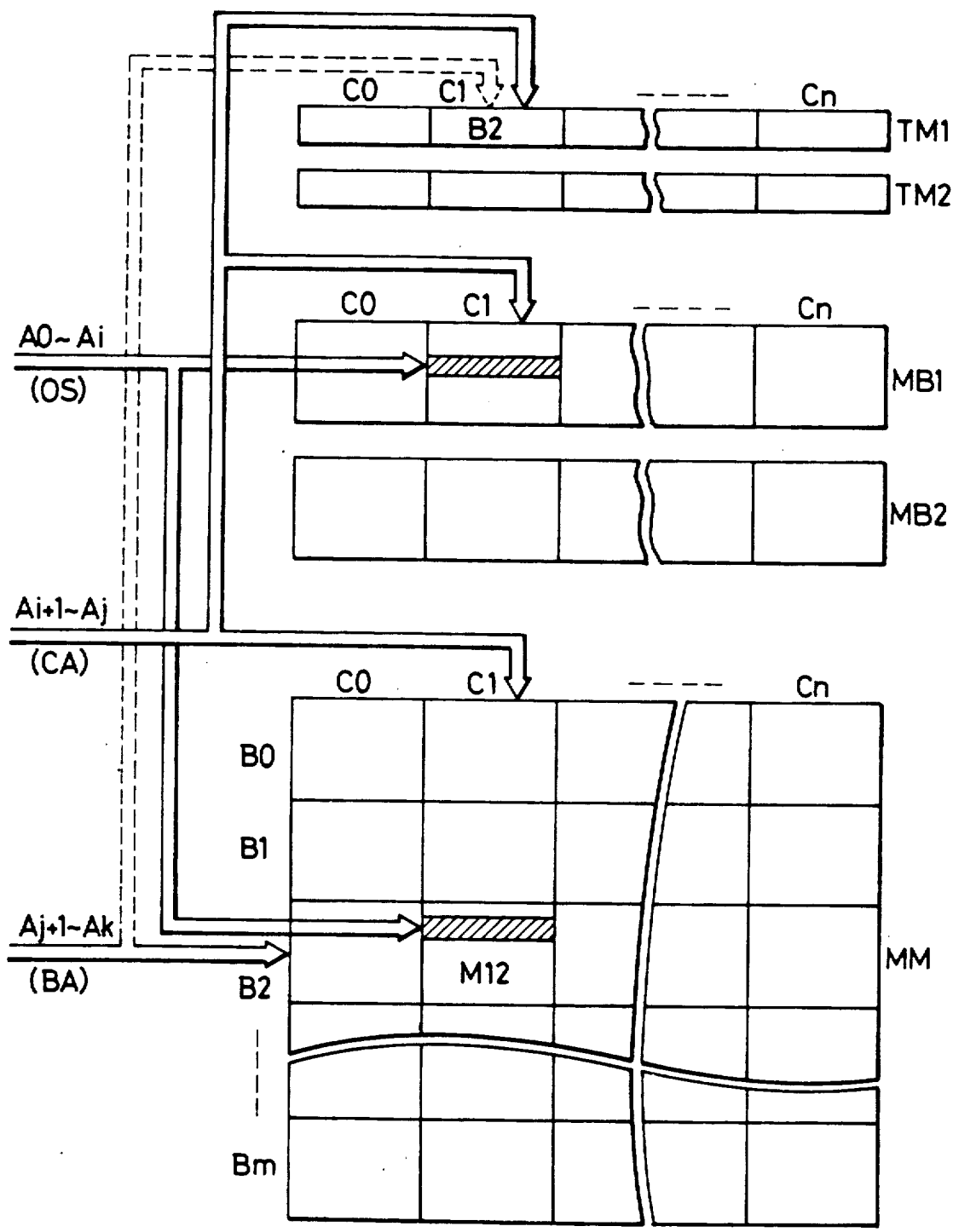
FIG. 4 is a conceptual view useful for explaining the memory construction of the hierarchal memory system to which the present invention is applied.

FIG. 4 is a conceptual view useful for explaining the memory construction of the hierarchal memory system to which the present invention is applied.

As shown in FIG. 4, the memory area of the main memory MM is divided into $(n+1)\times(m+1)$ blocks selected by $(n+1)$ column addresses Co–Cn and $(m+1)$ row addresses Bo–Bm. For example, one memory block M12 is selected by one row address B2, designated by a high order address signal $A_{j+1} \sim A_k$, and one column address C1, designated by an intermediate order address signal $A_{i+1} \sim A_j$. Each word in each memory block is selected by an offset signal OS, supplied as a lower order address signal $A_0 \sim A_i$.

Each memory bank MB1, MB2 in the cache memory CM consists of a memory medium capable of relatively high speed access such as a bipolar RAM, and the information stored in the main memory MM row to which access is made last for any column address is also stored in the memory bank. In other words, the size of the memory block and the number of memory banks are set so that the probability that the program required next by the CPU is stored in the memory bank is appropriately high. The program to be read out in the next instruction fetch cycle of the CPU is thus most probably contained in the cache memory CM capable of high speed access, and hence the processing capacity of the computer system including the microprocessor MPU can be improved.

In each memory bank MB1, MB2, (n+1) memory blocks are disposed in a single row in such a manner as to correspond to the column addresses $C_o \sim C_n$, and the information stored in the corresponding memory blocks at the column addresses of the main memory MM are stored in each memory block in the memory bank unit. The identity of the row address of the main memory MM to which the memory data duplicated in the memory blocks of memory bank MB1, MB2 belongs is stored in the corresponding column address of the corresponding tag memory TM1 or TM2.

Figure 5:
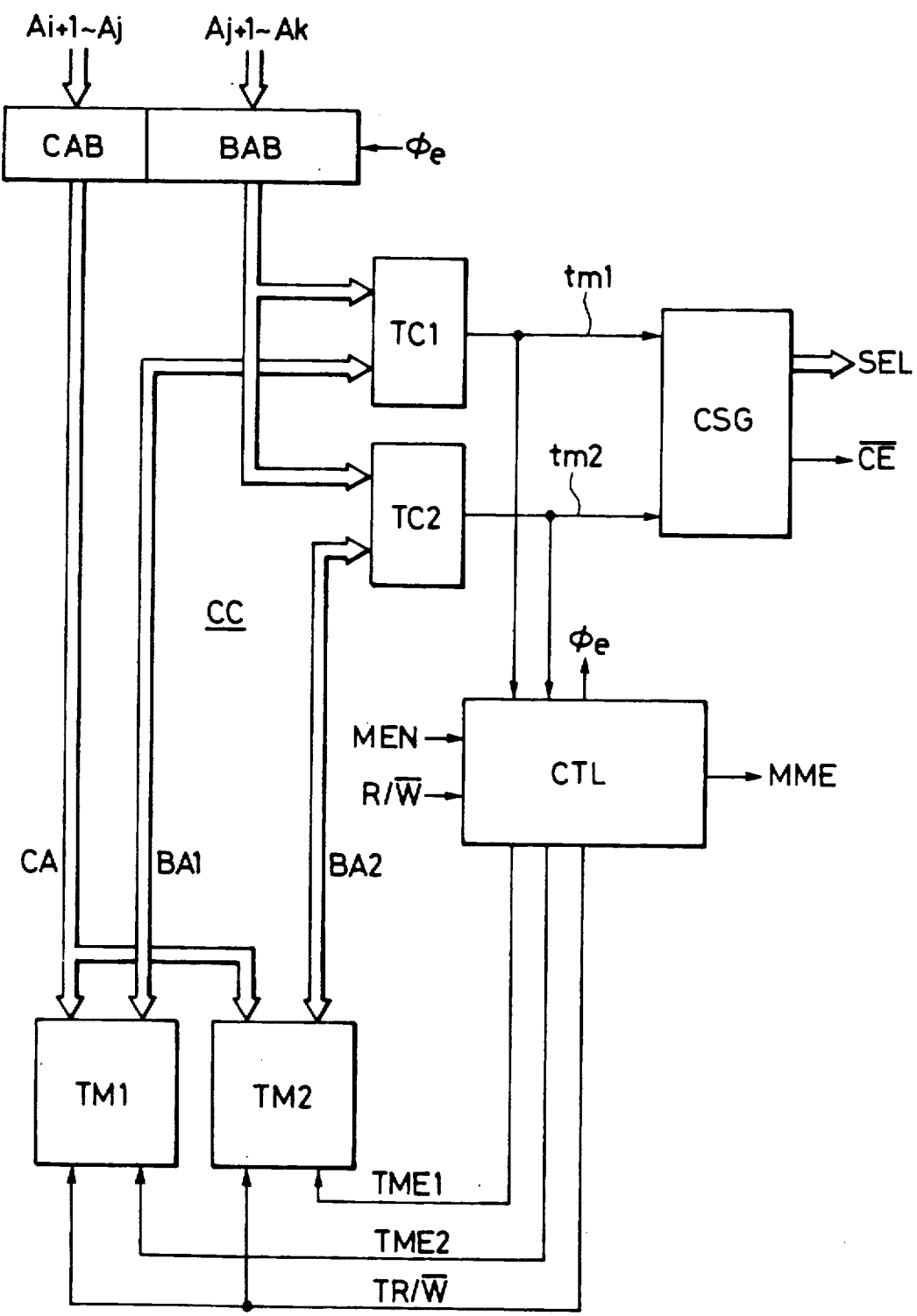
FIG. 5 is a block diagram showing an example of the construction of the cache controller shown in FIG. 1.

FIG. 5 is a block circuit diagram showing an example of the cache controller CC.

Though not particularly limitative, the higher order address signals $A_{j+1} \sim A_k$, among the address signals supplied from the microprocessor MPU, are taken into the block address buffer BAB of the cache controller CC as the block address signal BA and are further supplied to one of the input terminals of one of tag comparison circuits TC1 and TC2. The block address signals BA1 and BA2, read out from the tag memories TM1 and TM2, are supplied to the other input terminals of the tag comparison circuits TC1 and TC2. On the other hand, the intermediate order address signals $A_{i+1} \sim A_j$ are received as the column address signals CA by the column address buffer CAB of the cache controller CC and are further supplied to address decoders, not shown, of the tag memories $TM_1$ and $TM_2$. A memory enable signal MEN and the read/write signal R/$\overline{W}$, supplied as the start signals from the CPU, are supplied to the control circuit CTL of the cache controller CC. The read/write signal R/$\overline{W}$ is supplied also to the cache memory CM and the main memory MM.

The block address buffer BAB and the column address buffer CAB receive the block address and the column address transmitted through the system address bus SA-BUS in accordance with the timing signal $\phi e$ supplied from the control circuit CTL. The tag memories TM1 and TM2 are rendered operative by the tag memory enable signal TME1 or TME2 and the tag memory read/write signal TR/$\overline{W}$, supplied from the control circuit CTL, and read out the block addresses stored at the addresses designated by the column address signals CA, supplied from the column address buffer CAB, and output the read-out signals to the corresponding tag comparison circuits TC1 and TC2.

The tag comparison circuits TC1 and TC2 compare the block address read out from the tag memories TM1 and TM2 with the block address supplied from the microprocessor MPU through the block address buffer BAB. When the block addresses supplied to both input terminals of these tag comparison circuits TC1, TC2 are in conformity with each other, the output signal $tm_1$ or $tm_2$ of the tag comparison circuit $TC_1$ or $TC_2$ becomes a high level signal. Incidentally, though not particularly limitative, when the block address of the memory block is to be duplicated afresh to the cache memory for the tag memory TM1, TM2, the block address is supplied to each tag memory through the block address buffer BAB, the tag comparison circuit TC1 or TC2 and the tag data bus BA1 or BA2.

Though not particularly limitative, the output signals, $tm_1$ and $tm_2$ of the tag comparison circuits TC1 and TC2 are supplied to the control circuit CTL and to the control signal generation circuit CSG for the cache memory CM.

When the block addresses supplied to both input terminals are not in conformity with one another in the tag comparison circuits TC1 and TC2 of the cache controller CC, or in other words, when the output signals $tm_1$ and $tm_2$ of the tag comparison circuits TC1 and TC2 are at a low level, the control circuit CTL switches the main memory enable signal MME to a high level, so that the main memory MM reads out the stored data of the designated address of the corresponding memory block in accordance with the block address signal BA, the column address signal CA and the offset signal OS transmitted to the system address bus SA-BUS and outputs the data to the CPU through the system data bus SD-BUS. Thereafter, all the stored data of the corresponding memory blocks are read out sequentially and are stored in the memory blocks of the corresponding column addresses of the memory bank MB1 or MB2. The block address on the main memory MM of the memory block taken into the memory bank MB1 or MB2 is written as the tag into the corresponding column address of the corresponding tag memory TM1 or TM2.

When either one of the output signals $tm_1$ and $tm_2$ of the tag comparison circuits TC1 and TC2 is at the high level, the memory bank selection signal SEL and the cache enable signal $\overline{CE}$ are sent from the control signal generation circuit CSG.

In the embodiment of FIG. 5, two tag memories and two tag comparison circuits are shown, but their number is not particularly limitative. Accordingly, three or more may be utilized. In other words, the tag memories and the tag comparison circuits are provided in accordance with the number of the memory banks so that the control signal for selecting the data for writing the data into a specific memory bank and the data read out from a plurality of memory banks can be obtained from the control signal generation circuit CSG.

The present invention can provide the following effects.

(1) When the CPU outputs the address for referring to the memory, access to the cache memory is immediately started by use of the address signal and in the mean time, the cache controller determines whether or not the data required by the CPU exists in the cache memory and generates the selection signal for outputting only the data read out from the desired bank to the bus. Accordingly, the time necessary for the address comparison in the cache controller is not added to the access cycle time of the cache memory so that the access time can be shortened and the through-put of the system can be improved.

(2) Since the cache memory, its peripheral logic gate circuits and the output multiplexer are formed on the same semiconductor chip, the delay time in the gate circuits as the peripheral circuits of the cache memory can be shortened and hence, the access time of the cache memory can be reduced.

Although the present invention has thus been described with reference to the preferred embodiment thereof, the invention is not of course limited thereto, in particular, and can be changed or modified in various ways without departing from the scope and spirit thereof. For example, though the cache memory is divided into two memory banks in the embodiment described above, the number of banks is not limited to two. The present invention can be applied to a cache memory which is not divided into a plurality of memory banks.

Although the present invention has been described primarily with reference to the buffer memory device as the background and field of utilization of the invention, the present invention is not particularly limited thereto but can be utilized for systems in general for hierarchal memory.

What is claimed is:

1. A hierarchal memory system for use with a computer processor, said memory system comprising:

first memory means having a plurality of equal sized groups of memory blocks for storing information, each memory block of said first memory means identified by a memory address including a group portion identifying the group of which the memory block is a part and a block portion identifying the position of the memory block within its group, each memory block of said first memory means responsive to simultaneous receipt of a memory address signal indicative of the memory address of such memory block and a first control signal for outputting information stored in such memory block;

second memory means having a first plurality of memory blocks, equal in number to the number of groups of memory blocks in said first memory means, each memory block of said first plurality of memory blocks storing the information stored in a uniquely associated memory block in said first memory means, each of said uniquely associated memory blocks being from a different one of said groups of memory blocks in said first memory means, each memory block of said first plurality of memory blocks identified by an address corresponding with the group portion of the memory addresses of the memory blocks of the associated different one of said groups of memory blocks in said first memory means, each memory block of said first plurality of memory blocks responsive to receipt of a memory address signal having a group portion corresponding with the address of such memory block for outputting information stored in such memory block;

third memory means having a second plurality of memory blocks, equal in number to the number of groups of memory blocks in said first memory means, each memory block of said second plurality of memory blocks identified by an address corresponding with the address of an associated memory block of said first plurality of memory blocks and storing the block portion of the memory block address of the memory block in said first memory means that is storing the same information as is stored in said associated one of said first plurality of memory blocks;

first control means responsive to receipt of a memory address from a computer processor for assuming alternatively a first state or a second state, said first control means assuming the first state when the received memory address block portion is different from the block portion stored in the third memory means memory block identified by the group portion of the received memory address and assuming the second state when the received memory address block portion is the same as the block portion stored in the third memory means block identified by the group portion of the received memory address;

first signal generating means responsive to said first control means being in its first state for applying a first control signal to said first memory means to cause said first memory means to ouput the information stored in the first memory means memory block identified by the received memory address;

second signal generating means responsive to said first control means being in its second state for generating a second control signal;

an output terminal; and second control means coupled to said second memory means and responsive to the second control signal for applying to said output terminal the information output from said second memory means;

whereby, upon receipt of a data request from the computer processor, said second memory means outputs information to said second control means while said first control means is assuming one of its states so that the desired information is more rapidly available for output when said first control means assumes its second state, thereby reducing memory access time.

2. A hierarchal memory system according to claim 1, wherein:

said second memory means has a third plurality of memory blocks, equal in number to the number of groups of memory blocks in said first memory means, each memory block of said third plurality of memory blocks storing the information stored in a uniquely associated memory block in said first memory means, each of said uniquely associated memory blocks being from a different one of said groups of memory blocks in said first memory means, each memory block of said third plurality of memory blocks identified by an address corresponding with the group portion of the memory addresses of the memory blocks of the associated different one of said groups of memory blocks in said first memory means, each memory block of said third plurality of memory blocks responsive to receipt of a memory address signal having a group portion corresponding with the address of such memory block for outputting information stored in such memory block;

said third memory means has a fourth plurality of memory blocks, equal in number to the number of groups of memory blocks in said first memory means, each memory block of said fourth plurality of memory blocks identified by an address corresponding with the address of an associated memory block of said first plurality of memory blocks and storing the block portion of the memory block address of the memory block in said first memory means that is storing the same information as is stored in said associated one of said third plurality of memory blocks;

said first control means assumes the second state when the received memory address block portion is the same as the block portion stored in the memory block of said second plurality of memory blocks that is identified by the group portion of the received memory address and is further responsive to receipt of a memory address from the computer processor for alternatively assuming a third state when the received memory address block portion is the same as the block portion stored in the memory block of said fourth plurality of memory blocks that is identified by the group portion of the received memory address;

said second signal generating means is responsive to said first control means being in its third state for generating a third control signal; and said second control means is responsive to the second control signal for applying to said output terminal the information output from said first plurality of memory blocks and is responsive to the third control signal for applying to said output terminal the information output from said third plurality of memory blocks.

3. A hierarchal memory system according to claim 1, further comprising further means responsive to said first control signal for reading into said second memory means the information output from said first memory means for storage in the memory block of said first plurality of memory blocks that is associated with the first memory means memory block from which the information is read, and for reading into said third memory means the block portion of the received memory address for storage in the memory block of said second plurality of memory blocks that is identified by the group portion of the received memory address.

* * * * *